US008230974B2

(12) United States Patent
Parnin

(10) Patent No.: US 8,230,974 B2
(45) Date of Patent: Jul. 31, 2012

(54) WINDMILL AND ZERO GRAVITY LUBRICATION SYSTEM FOR A GAS TURBINE ENGINE

(75) Inventor: Francis Parnin, Suffield, CT (US)

(73) Assignee: United Technologies Corporation, Hartford, CT (US)

( * ) Notice: Subject to any disclaimer, the term of this patent is extended or adjusted under 35 U.S.C. 154(b) by 370 days.

(21) Appl. No.: 12/470,823

(22) Filed: May 22, 2009

(65) Prior Publication Data

US 2010/0294597 A1 Nov. 25, 2010

(51) Int. Cl.
*F16N 13/00* (2006.01)
*F01M 9/00* (2006.01)
(52) U.S. Cl. .................................... 184/6.11
(58) Field of Classification Search .............. 184/6.1, 184/6.2, 6.3, 6.11, 6.27, 27.2; 60/39.08, 60/226.1, 268, 802
See application file for complete search history.

(56) References Cited

U.S. PATENT DOCUMENTS

| | | | |
|---|---|---|---|
| 1,871,055 A | 8/1932 | Hasbrouck | |
| 1,920,012 A | 7/1933 | Good | |
| 2,239,098 A | 4/1941 | Hunter | |
| 2,324,464 A | 7/1943 | Parker | |
| 2,494,209 A | 1/1950 | Sikorsky | |
| 2,830,668 A | 4/1958 | Gaubis et al. | |
| 2,831,490 A | 4/1958 | Simcock | |
| 2,984,975 A | 5/1961 | Rodgers et al. | |
| 4,117,907 A | 10/1978 | Lechler | |
| 4,153,141 A | 5/1979 | Methlie | |
| 4,252,140 A | 2/1981 | Hildebrandt | |
| 4,309,870 A | 1/1982 | Guest et al. | |
| 4,367,638 A | 1/1983 | Gray | |
| 4,424,665 A * | 1/1984 | Guest et al. | 60/779 |
| 4,511,016 A * | 4/1985 | Doell | 184/6.11 |
| 4,531,358 A * | 7/1985 | Smith | 60/39.08 |
| 4,669,893 A | 6/1987 | Chalaire et al. | |
| 4,782,658 A | 11/1988 | Perry | |

(Continued)

FOREIGN PATENT DOCUMENTS

EP   1598531 A1   11/2005

(Continued)

OTHER PUBLICATIONS

Extra-Flugzeugbau GmbH, Service Manual Extra 300, Chapter 79-Oil System, page date: Jan. 31, 1995, pp. 1-12.

(Continued)

*Primary Examiner* — William E Dondero
*Assistant Examiner* — Mark K Buse
(74) *Attorney, Agent, or Firm* — Kinney & Lange, P.A.

(57) ABSTRACT

A pump system for lubricating a bearing in a gear system of a gas turbine engine includes a main pump, an auxiliary pump, an auxiliary reservoir, a sump, and a valve system. The main pump is fluidically connected to the bearing through a main supply passage. The auxiliary pump is fluidically connected to the bearing through an auxiliary supply passage. The valve system transfers lubricating liquid from the main pump to the bearing under a first set of engine operating conditions. The valve system transfers lubricating liquid from the auxiliary reservoir to the sump and from the sump through the auxiliary pump to the bearing under a second set of engine operating conditions. The valve system transfers lubricating liquid from the auxiliary reservoir through the auxiliary pump, bypassing the sump, to the bearing under a third set of engine operating conditions.

20 Claims, 5 Drawing Sheets

U.S. PATENT DOCUMENTS

| | | | |
|---|---|---|---|
| 4,813,445 A | | 3/1989 | Lu |
| 4,888,947 A | * | 12/1989 | Thompson ............... 60/39.08 |
| 4,891,934 A | * | 1/1990 | Huelster ................. 60/39.08 |
| 4,947,639 A | | 8/1990 | Hibner et al. |
| 4,974,410 A | * | 12/1990 | Wright et al. ........... 60/39.08 |
| 4,976,335 A | * | 12/1990 | Cappellato ................ 184/6.4 |
| 4,983,051 A | | 1/1991 | Hibner et al. |
| 5,107,676 A | | 4/1992 | Hadaway et al. |
| 5,110,257 A | | 5/1992 | Hibner et al. |
| 5,121,598 A | | 6/1992 | Butler |
| 5,344,239 A | | 9/1994 | Stallone et al. |
| 5,433,674 A | | 7/1995 | Sheridan et al. |
| 5,472,383 A | | 12/1995 | McKibbin |
| 5,590,736 A | | 1/1997 | Morris et al. |
| 5,611,411 A | * | 3/1997 | Reilly, III ................. 184/6.4 |
| 5,911,678 A | | 6/1999 | White |
| 6,223,616 B1 | | 5/2001 | Sheridan |
| 6,267,147 B1 | | 7/2001 | Rago |
| 6,463,819 B1 | * | 10/2002 | Rago ........................ 184/6.2 |
| 6,481,978 B2 | * | 11/2002 | Zamalis et al. ............ 417/228 |
| 6,793,042 B2 | | 9/2004 | Broullet |
| 6,968,701 B2 | * | 11/2005 | Glahn et al. ................ 60/792 |
| 7,118,336 B2 | | 10/2006 | Waddleton |
| 7,377,100 B2 | * | 5/2008 | Bruno et al. ................ 60/267 |
| 7,426,834 B2 | * | 9/2008 | Granitz et al. .............. 60/772 |
| 7,506,724 B2 | * | 3/2009 | Delaloye ................... 184/6.2 |
| 7,530,430 B2 | * | 5/2009 | Hoang et al. .............. 184/6.2 |
| 7,712,317 B2 | | 5/2010 | Scanlon |
| 7,854,582 B2 | * | 12/2010 | Ullyott ........................ 415/1 |
| 7,926,290 B2 | * | 4/2011 | Johnson ...................... 60/785 |
| 2005/0135929 A1 | | 6/2005 | Waddleton |
| 2008/0063333 A1 | | 3/2008 | Bruno et al. |
| 2010/0212281 A1 | * | 8/2010 | Sheridan ................... 60/39.08 |
| 2011/0108360 A1 | * | 5/2011 | DiBenedetto .............. 184/6.11 |

FOREIGN PATENT DOCUMENTS

EP    1925856 A2    5/2008

OTHER PUBLICATIONS

Search Report and Written Opinion of the European Patent Office dated Apr. 28, 2011, in foreign counterpart application No. 09718423.8, filed May 22, 2009.

Office Action of the European Patent Office in counterpart Application No. 10163707.2, dated Mar. 22, 2012.

* cited by examiner

US 8,230,974 B2

WINDMILL AND ZERO GRAVITY LUBRICATION SYSTEM FOR A GAS TURBINE ENGINE

CROSS-REFERENCE TO RELATED APPLICATIONS

Reference is made to application Ser. No. 12/470,903 entitled "GRAVITY OPERATED VALVE" and application Ser. No. 12/470,875 entitled "APPARATUS AND METHOD FOR PROVIDING DAMPER LIQUID IN A GAS TURBINE ENGINE" which are filed on even date and are assigned to the same assignee as this application, the disclosures of which are incorporated by reference in their entirety.

Reference is also made to application Ser. No. 12/393,743 entitled "AUXILIARY PUMP SYSTEM FOR FAN DRIVE GEAR SYSTEM", filed on Feb. 26, 2009 by William G. Sheridan and is assigned to the same assignee as this application, the disclosure of which is incorporated by reference in its entirety.

BACKGROUND

The present invention relates to a lubrication system, and more particularly, to a lubrication system for a fan drive gear system in gas turbine engines.

In many gas turbine engines, a low pressure spool includes a low pressure turbine connected to and driving a low pressure compressor, and a high pressure spool includes a high pressure turbine connected to and driving a high pressure compressor. A main pump is typically driven by the high pressure spool, connected through gearing, and is used to pump lubricating and cooling liquid to all engine components that require lubrication and cooling.

The main pump typically pumps liquid from a passage connected to a main reservoir that holds both liquid and air. During normal operating conditions, the liquid settles at the bottom of the main reservoir and displaces air to the top. However, in a gas turbine engine mounted on an aircraft, the main reservoir may experience "negative gravity" conditions such as the aircraft turning upside down, the aircraft accelerating toward the Earth at a rate equal to or greater than the rate of gravity, or the aircraft decelerating at the end of a vertical ascent. Under negative gravity conditions, the liquid in the main reservoir can rise to the top, which can expose an opening of the passage to air and interrupt the supply of liquid to the main pump and, consequently, interrupt supply to the engine components. Certain engine components, such as gears and bearings, can be damaged by a relatively short period of non-lubricated operation during negative gravity conditions.

In some gas turbine engines, a fan at the front of the engine is connected to the low pressure spool through a fan drive gear system. When the high pressure spool stops rotating or rotates at a reduced rpm (revolutions per minute), the fan drive gear system can continue rotating even though the main pump will ordinarily provide little or no liquid during this time. For example, wind may rotate the fan and corresponding gears and bearings while the aircraft is parked on the ground or during an in-flight engine shutdown. Certain gears and bearings can also be damaged by a relatively short period of non-lubricated operation during windmilling as well.

SUMMARY

According to the present invention, a pump system for lubricating a bearing in a gear system of a gas turbine engine includes a main pump, an auxiliary pump, an auxiliary reservoir, a sump, and a valve system. The main pump is fluidically connected to the bearing through a main supply passage. The auxiliary pump is fluidically connected to the bearing through an auxiliary supply passage. The valve system transfers lubricating liquid from the main pump to the bearing under a first set of engine operating conditions. The valve system transfers lubricating liquid from the auxiliary reservoir to the sump and from the sump through the auxiliary pump to the bearing under a second set of engine operating conditions. The valve system transfers lubricating liquid from the auxiliary reservoir through the auxiliary pump, bypassing the sump, to the bearing under a third set of engine operating conditions.

Another embodiment includes a method of pumping lubricating liquid in a gas turbine engine. The method includes sensing an engine operating condition, supplying lubricating liquid from an auxiliary reservoir to a sump and from the sump to an auxiliary pump when the sensed engine operating condition has a first value in a first range, and supplying lubricating liquid from the auxiliary reservoir to the auxiliary pump, bypassing the sump, when the sensed engine operating condition has a second value in a second range.

DETAILED DESCRIPTION

In general, the present invention is a pump system for lubricating bearings in a fan drive gear system. The pump system includes a main pump for supplying lubricating liquid during ordinary engine operating conditions, an auxiliary pump for supplying the liquid when the main pump loses pressure, and a valve for selecting between the two. The pump system also includes a sump for supplying the liquid to the auxiliary pump during windmill conditions, an auxiliary reservoir for supplying the liquid to the auxiliary pump during zero and negative gravity conditions, and another valve for selecting between those two.

Figure 1:
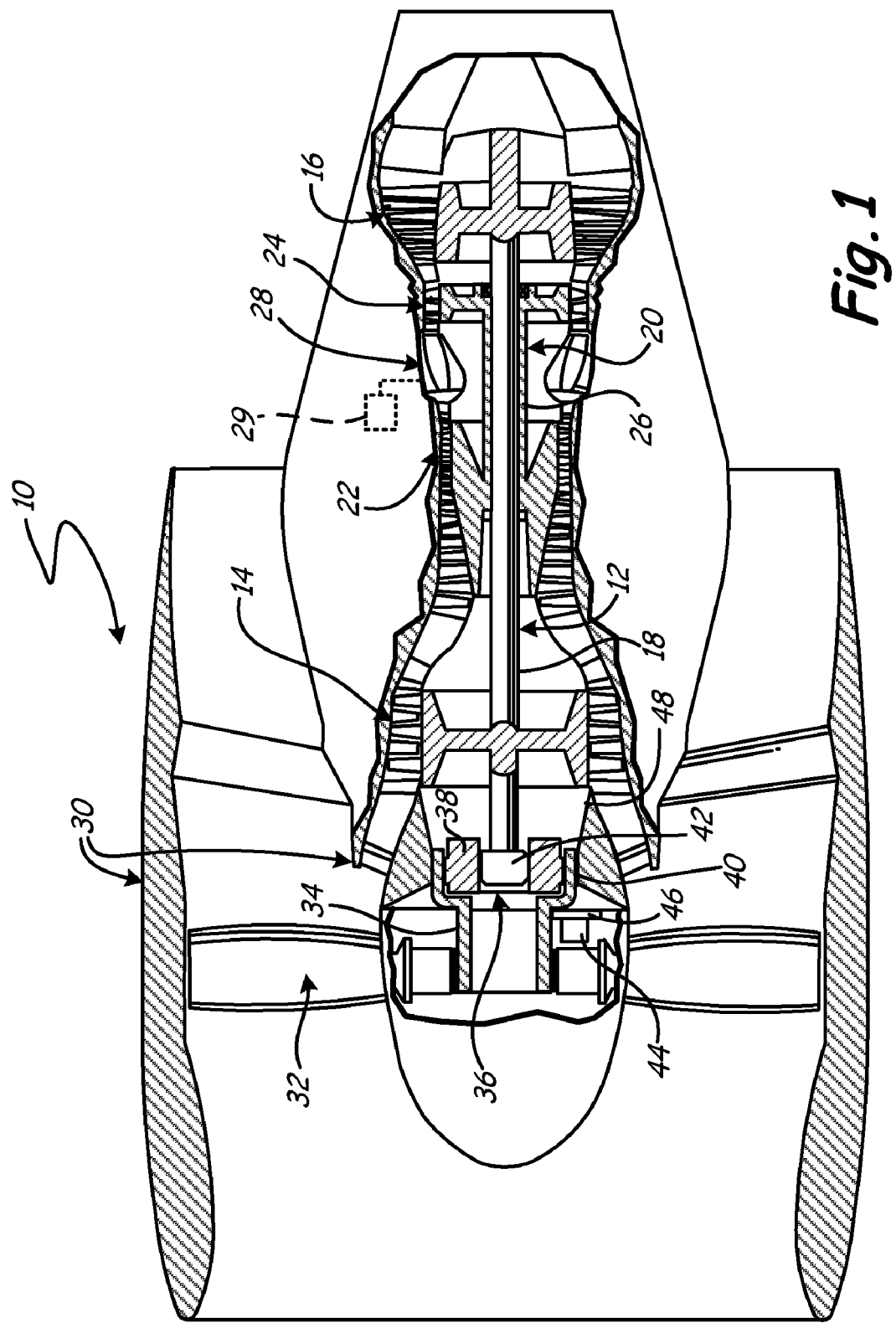
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, fuel pump 29, nacelle 30, fan 32, fan shaft 34, and fan drive gear system 36 (which includes star gear 38, ring gear 40, and sun gear 42). The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. In the illustrated embodiment, fan drive gear system 36 is a "star gear system". Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves about its axis, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both of fan 32 and low pressure spool 12. In an alternative embodiment, fan drive gear system 36 can be a "planetary gear system". In a planetary gear system, ring gear 40 is fixed and fan shaft 34 is attached to a carrier (not shown) that carries star gear 38 (also called a planet gear). Star gear 38 orbits about sun gear 42 as it spins between sun gear 42 and ring gear 40.

Auxiliary pump 44 is coupled to and is driven by fan shaft 34 via pump gear 46 such that pump 44 can operate whenever fan shaft 34 is rotating. Auxiliary pump 44 supplies liquid, such as oil, to lubricate gears and bearings of fan drive gear system 36. Fan drive gear system 36 benefits from a relatively continuous supply of lubricating liquid whenever fan shaft 34 is rotating. At least some of the liquid supplied to fan drive gear system 36 drains to sump 48 and is eventually pumped back through auxiliary pump 44. In an alternative embodiment, auxiliary pump 44 can be an electrically driven oil pump.

Figure 2:
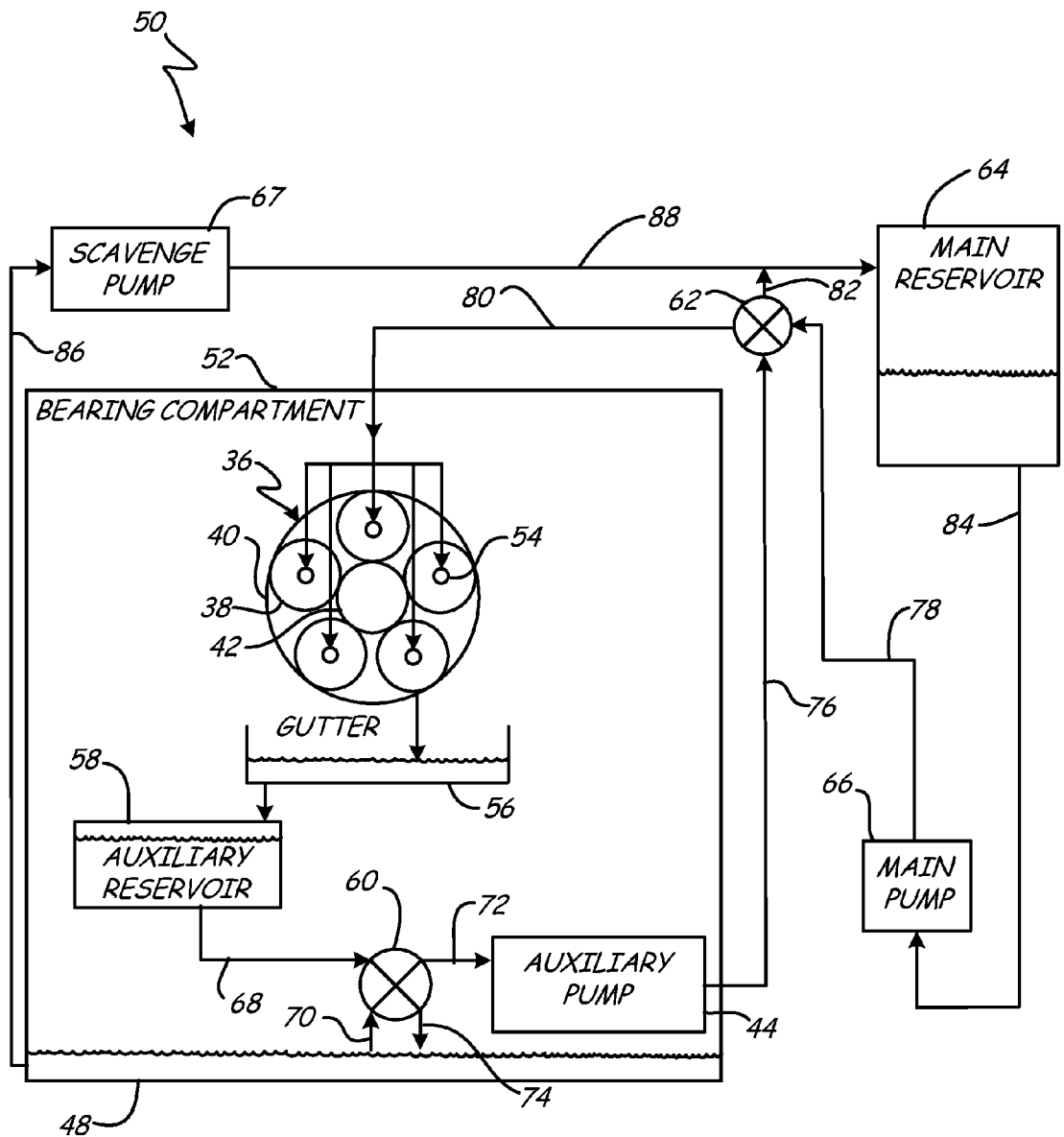
FIG. 2 is a schematic view of a pump system of the present invention.

FIG. 2 is a schematic view of pump system 50. Pump system 50 includes bearing compartment 52 having a compartment cavity that contains fan drive gear system 36 (including bearings 54), auxiliary pump 44, gutter 56, auxiliary reservoir 58, and first shuttle valve 60. Pump system 50 also includes second shuttle valve 62, main reservoir 64, main pump 66, and scavenge pump 67 positioned outside of bearing compartment 52. Passages 68, 70, 72, 74, 76, 78, 80, 82, 84, 86, and 88 connect the various components as illustrated and as further described, below.

As fan drive gear system 36 spins, lubricating liquid drips or flies off fan drive gear system 36 into bearing compartment 52 in different directions. A portion of that liquid is caught and collected by gutter 56 and funneled to auxiliary reservoir 58. During normal operating conditions, auxiliary reservoir 58 is kept substantially full of liquid for later use. In one embodiment, auxiliary reservoir 58 contains enough liquid to provide adequate lubrication for fan drive gear system 36 for at least 10 seconds. Gutter 56 does not collect all liquid leaving fan drive gear system 36. The remaining liquid that is not collected by gutter 56 falls to sump 48, which is an open-top reservoir at a bottom of bearing compartment 52. Bearing compartment 52 can be sealed to reduce liquid flow out of bearing compartment 52, except through designated passages as herein described.

First shuttle valve 60 is fluidically connected to auxiliary reservoir 58 via passage 68, to sump 48 via passage 70, to auxiliary pump 44 via passage 72, and again to sump 48 via passage 74. First shuttle valve 60 selectively directs fluid flow from auxiliary reservoir 58 or sump 48 to auxiliary pump 44 in a manner further described below with respect to FIGS. 3A and 3B.

Second shuttle valve 62 is fluidically connected to auxiliary pump 44 via passage 76, to main pump 66 via passage 78, to bearings 54 via passage 80, and to main reservoir 64 via passages 82 and 88. In the illustrated embodiment, passage 76 is an auxiliary supply passage and passage 78 is a main supply passage. Second shuttle valve 62 selectively directs fluid flow from auxiliary pump 44 or main pump 66 to bearings 54 in a manner further described below with respect to FIGS. 4A and 4B. Main reservoir 64 is further connected to main pump 66 through passage 84. Scavenge pump 67 is connected to sump 48 via passage 86 and to main reservoir 64 via passage 88. Scavenge pump 67 pumps a portion of the liquid in sump 48 to main reservoir 64 for use by main pump 66.

As part of pump system 50, first shuttle valve 60 and second shuttle valve 62 work together as a valve system. This valve system directs lubricating liquid to bearings 54 from one of sump 48, auxiliary reservoir 58, or main reservoir 64. The pump system selects among these potential sources of lubricating liquid based upon sensed engine operating conditions.

Figure 3A:
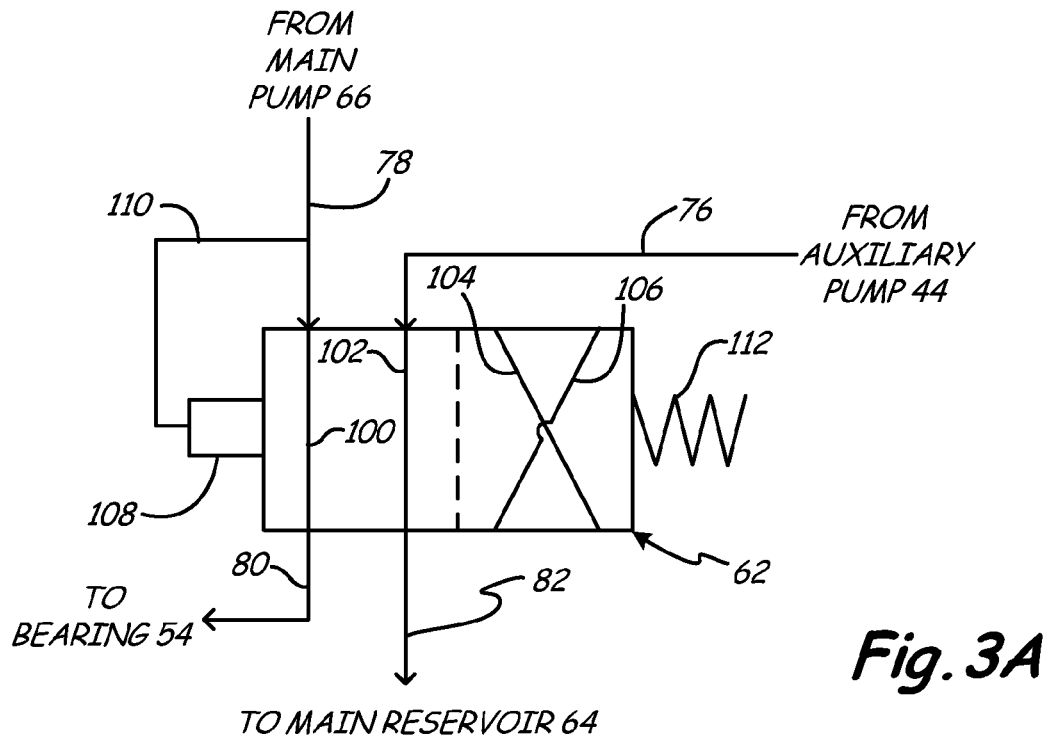
FIG. 3A is a schematic view of a second shuttle valve in a first position.

FIG. 3A is a schematic view of second shuttle valve 62 in a first position. Second shuttle valve 62 includes valve passages 100, 102, 104, and 106, sensor 108, sensor passage 110, and spring 112. In the first position, valve passage 100 is aligned with passages 78 and 80 to direct flow from main pump 66 to bearings 54. Valve passage 102 is aligned with passages 76 and 82 to direct flow from auxiliary pump 44 to passage 88 which is connected to main reservoir 64. In an alternative embodiment, passage 82 can be connected directly to main reservoir 64, bypassing passage 88. In yet another embodiment, passage 82 can be connected to sump 48 instead of main reservoir 64. In the illustrated embodiment, valve passages 104 and 106 are not aligned with any exterior passages. Valve passages 104 and 106 are, effectively, unused in the first position.

Sensor 108 can be one of a variety of sensors for sensing an engine operating condition such as pressure. Sensor 108 is connected to second shuttle valve 62 for actuating second shuttle valve 62 between first and second positions based upon the sensed engine operating condition. Sensor 108 is also fluidically connected to passage 78, through sensor passage 110, to sense pressure in passage 78. When sensor 108 senses pressure in passage 78 exceeding a threshold, it provides a force greater than that of spring 112, actuating second shuttle valve 62 into the first position and compressing spring 112. Second shuttle valve 62 can be actuated mechanically, electronically, or a combination of mechanically and electronically.

Figure 3B:
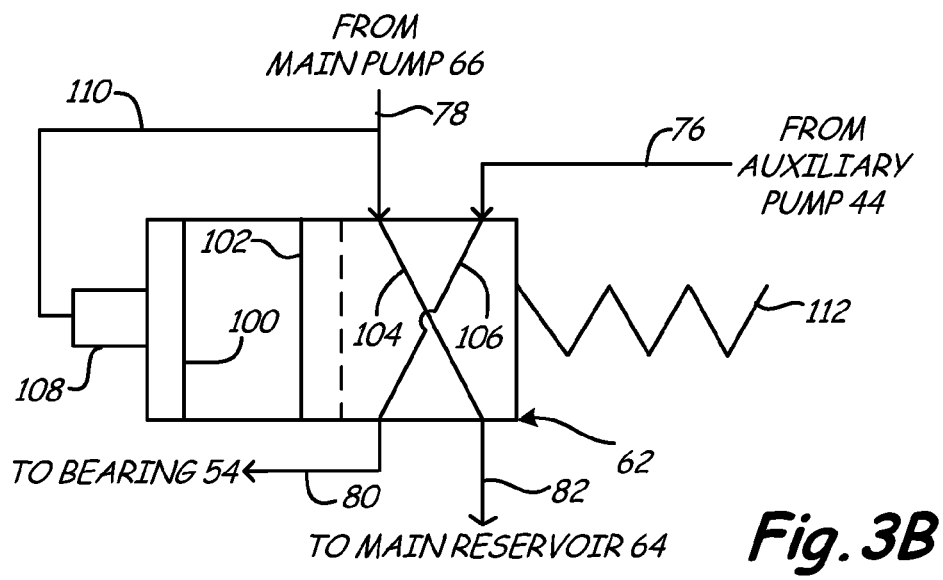
FIG. 3B is a schematic view of the second shuttle valve in a second position.

FIG. 3B is a schematic view of second shuttle valve 62 in a second position. When sensor 108 senses the pressure in passage 78 below the threshold, it provides a force less than that of spring 112. Thus, spring 112 can extend and actuate second shuttle valve 62 into the second position. In the second position, valve passages 100 and 102 are no longer aligned with any exterior passages and are, effectively, unused. Valve passage 104 is aligned with passages 78 and 82 to direct flow from main pump 66 to main reservoir 64. Valve passage 106 is aligned with passages 76 and 80 to direct flow from auxiliary pump 44 to bearings 54. In an alternative embodiment, passage 78 need not be connected to passage 82. Instead, valve passage 104 could be replaced with a valve passage ending (a dead-head) to reduce flow.

Under ordinary operating conditions, main pump 66 can supply adequate fluid for lubricating most components in gas turbine engine 10, including fan drive gear system 36 and bearing 54. When main pump 66 is supplying adequate liquid, pressure in passage 78 is above a threshold. Sensor 108 senses that pressure and actuates second shuttle valve 62 to the first position so long as the pressure is above the threshold. In the first position, main pump 66 supplies liquid to bearing 54. Liquid from auxiliary pump 44 is not needed at that time.

Consequently, liquid from auxiliary pump 44 is directed to main reservoir 64 by second shuttle valve 62 in the first position.

If, however, sensor 108 senses that pressure in passage 78 is below the threshold, that indicates that main pump 66 may not be supplying adequate liquid to bearings 54. Then sensor 108 exerts a reduced force on second shuttle valve 62, allowing spring 112 to expand and actuate second shuttle valve 62 to the second position. In the second position, auxiliary pump 44 supplies liquid to bearings 54. Main pump 66 is then connected to main reservoir 64 through passage 82 to direct any fluid that is still being pumped through passage 78 back to main reservoir 64. Second shuttle valve 62 remains in the second position unless and until pressure in passage 78 exceeds the threshold again.

In one embodiment, bearings 54 are journal bearings. Journal bearings can benefit from having a supply of substantially continuous lubricating liquid. Consequently, bearings 54 can benefit from having liquid supplied from auxiliary pump 44 when engine operating conditions prevent main pump 66 from supplying adequate liquid. This benefit depends on auxiliary pump 44 having an adequate supply of liquid during those engine operating conditions.

Figure 4A:
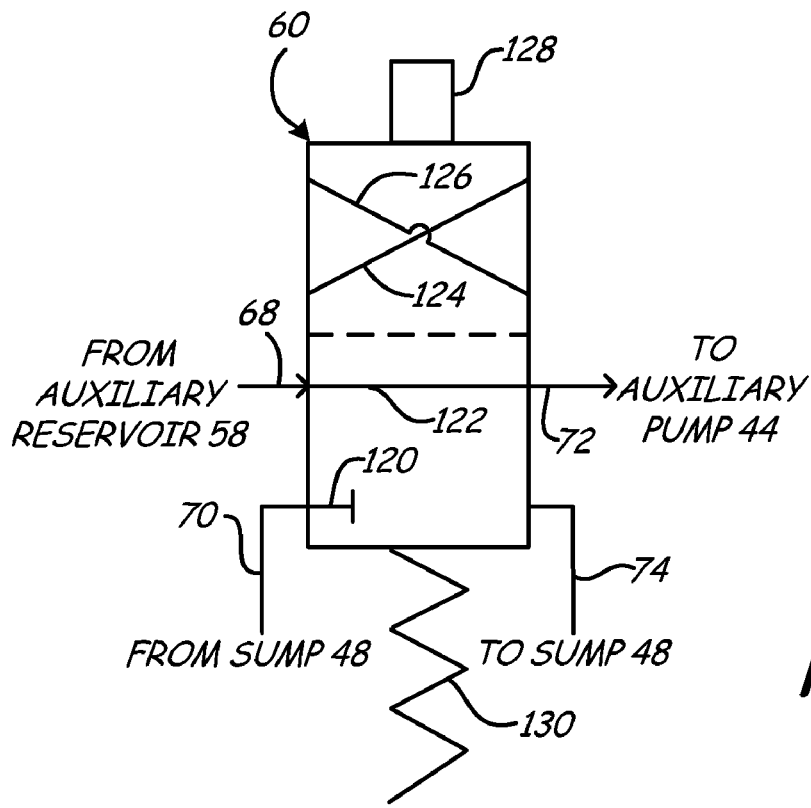
FIG. 4A is a schematic view of a first shuttle valve in a first position.

FIG. 4A is a schematic view of first shuttle valve 60 in a first position. First shuttle valve 60 includes valve passage ending 120, valve passages 122, 124, and 126, sensor 128, and spring 130. In the first position, valve passage ending 120 is aligned with passage 70 to reduce or prevent flow from sump 48. In an alternative embodiment, valve passage ending 120 could be replaced with a valve passage aligned with and connecting passages 70 and 74. Valve passage 122 is aligned with passages 68 and 72 to direct flow from auxiliary reservoir 58 to auxiliary pump 44. Valve passages 124 and 126 are not aligned with any exterior passages. Valve passages 124 and 126 are, effectively, unused in the first position. The ultimate effect of the first position is to supply liquid from auxiliary reservoir 58 to auxiliary pump 44.

Sensor 128 can be one of a variety of sensors for sensing an engine operating condition. Sensor 128 is connected to first shuttle valve 60 for actuating first shuttle valve 60 between first and second positions based upon the sensed engine operating condition. When sensor 128 senses the sensed engine operating condition having a value in a first range, it provides a force less than that of spring 130, allowing spring 130 to extend and actuate first shuttle valve 60 into the first position. First shuttle valve 60 can be actuated mechanically, electronically, or a combination of mechanically and electronically.

Figure 4B:
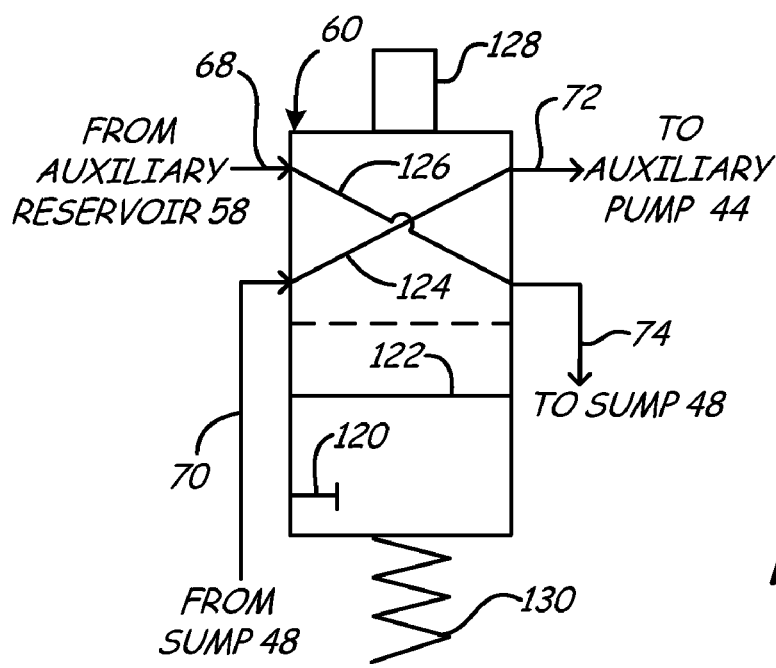
FIG. 4B is a schematic view of the first shuttle valve in a second position.

FIG. 4B is a schematic view of first shuttle valve 60 in a second position. When sensor 128 senses the sensed operating condition having a value in a second range, it provides a force greater than that of spring 130, actuating first shuttle valve 60 into the second position and compressing spring 130. In the second position, valve passage ending 120 and valve passage 122 are no longer aligned with any exterior passages and are, effectively, unused. Valve passage 124 is aligned with passages 70 and 72 to direct flow from sump 48 to auxiliary pump 44. Valve passage 126 is aligned with passages 68 and 74 to direct flow from auxiliary reservoir 68 to sump 74. The ultimate effect of the second position is to dump excess liquid from auxiliary reservoir 58 to sump 48 and to supply liquid from sump 48 to auxiliary pump 44.

In one embodiment, sensor 128 can be a gravity sensor, such as a simple weight connected to first shuttle valve 60, and the sensed engine condition can be gravity. When gravitational forces acting on sensor 128 are below a threshold, such as zero and negative gravity conditions, the weight of sensor 128 is reduced, and spring 130 can extend such that first shuttle valve 60 is in the first position as illustrated in FIG. 4A. When gravitational forces acting on sensor 128 exceed a threshold, such as normal gravity conditions, the weight of sensor 128 can push down on first shuttle valve 60, compressing spring 130, such that first shuttle valve 60 is in the second position as illustrated in FIG. 4B. In an alternative embodiment, spring 130 can be omitted, and first shuttle valve 60 can be actuated solely by sensor 128.

Normal gravity conditions can occur when gravity is positive, such as when gas turbine engine 10 is parked on the ground, flying level, ascending, or gradually descending. Negative and zero gravity conditions can occur when gravity is sensed to be approximately zero or negative, such as when gas turbine engine 10 is upside down, accelerating toward the Earth at a rate equal to or greater than the rate of gravity, or decelerating at the end of a vertical ascent.

Under zero and negative gravity conditions, liquid in sump 48 and main reservoir 64 can rise to their respective tops, interrupting supply to passages 70 and 84, respectively. On the other hand, auxiliary reservoir 58 is kept substantially full of lubricating liquid and is adapted to supply that liquid during negative gravity conditions. In one embodiment, however, auxiliary reservoir 58 only holds enough liquid to supply for a limited amount of time, such as about 10 seconds. Auxiliary reservoir 58 does not collect liquid fast enough to supply the liquid for long durations. Thus, first shuttle valve 60 supplies liquid from sump 48 to auxiliary pump 44, under ordinary gravity conditions, which is most of the time. First shuttle valve 60 then switches and supplies from auxiliary reservoir 58 only for brief periods of zero or negative gravity.

Using first shuttle valve 60 in combination with second shuttle valve 62 can provide substantially continuous liquid to bearings 54. As described above with respect to FIGS. 3A and 3B, second shuttle valve 62 directs fluid from auxiliary pump 44 to bearings 54 when main pump 66 does not supply adequate liquid. If main pump 66 is not supplying adequate liquid due to zero or negative gravity conditions, then first shuttle valve 60 directs fluid from auxiliary reservoir 58 to bearings 54. If, however, main pump 66 is not supplying adequate liquid due to some reason other than negative gravity conditions, then first shuttle valve 60 directs fluid from sump 48 to bearings 54.

Figure 5A:
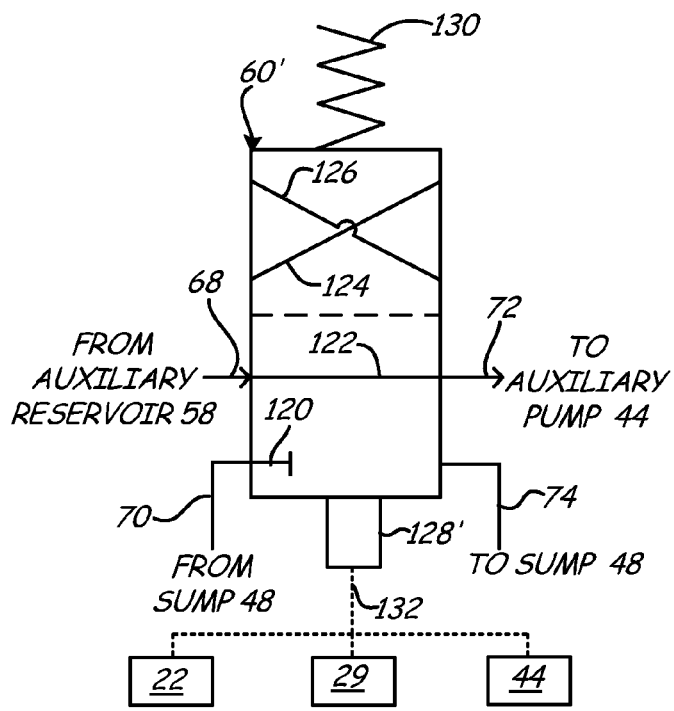
FIG. 5A is a schematic view of another embodiment of the first shuttle valve in a first position.

FIG. 5A is a schematic view of a different embodiment of first shuttle valve 60' in a first position. First shuttle valve 60' includes valve passage ending 120, valve passages 122, 124, and 126, sensor 128', spring 130, and sensor passage 132. In the first position, valve passage ending 120 is aligned with passage 70 to reduce or prevent flow from sump 48. Valve passage 122 is aligned with passages 68 and 72 to direct flow from auxiliary reservoir 58 to auxiliary pump 44. Valve passages 124 and 126 are not aligned with any exterior passages. Valve passages 124 and 126 are, effectively, unused in the first position.

Sensor 128' can be one of a variety of sensors for sensing an engine operating condition. Sensor 128' is connected to first shuttle valve 60' for actuating first shuttle valve 60' between first and second positions based upon the sensed engine operating condition. When sensor 128' senses the sensed engine operating condition exceeding a threshold, it provides a force greater than that of spring 130, actuating first shuttle valve 60' into the first position and compressing spring 130.

Figure 5B:
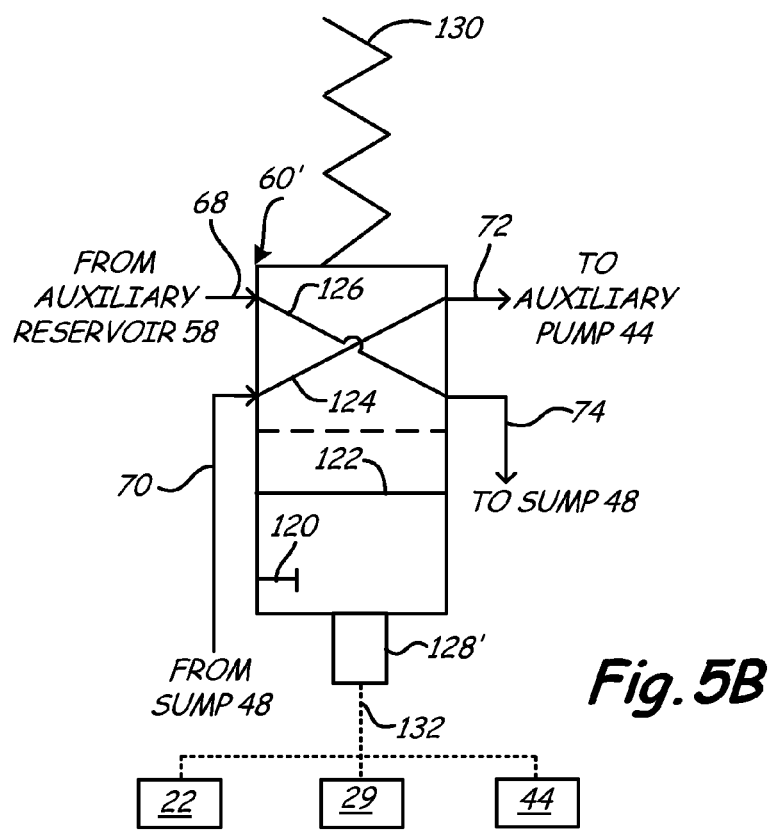
FIG. 5B is a schematic view of another embodiment of the first shuttle valve in a second position.

FIG. 5B is a schematic view of first shuttle valve 60' in a second position. When sensor 128' senses the sensed operating condition below the threshold, it provides a force less than that of spring 130. Thus, spring 130 can expand and actuate first shuttle valve 60' into the second position. In the second position, valve passage ending 120 and valve passage 122 are no longer aligned with any exterior passages and are, effectively, unused. Valve passage 124 is aligned with passages 70 and 72 to direct flow from sump 48 to auxiliary pump 44. Valve passage 126 is aligned with passages 68 and 74 to direct flow from auxiliary reservoir 68 to sump 74.

First shuttle valve 60' as illustrated in FIGS. 5A and 5B is substantially similar to first shuttle valve 60 as illustrated in FIGS. 4A and 4B except for two differences. The first difference is that sensor 128' swaps positions with spring 130. Thus, spring 130 is compressed when first shuttle valve 60' is in the first position, whereas spring 130 is extended when first shuttle valve 60 is in the first position. The second difference is a difference between sensor 128' and sensor 128.

Sensor 128' as illustrated in FIGS. 5A and 5B is a buffer pressure reference sensor and the sensed operating condition is pressure. Sensor 128' is fluidically connected to a component in gas turbine engine 10, through sensor passage 132, for sensing pressure at that component. When sensor 128' senses pressure exceeding a threshold, it provides a force greater than that of spring 130, actuating first shuttle valve 60' into the first position and compressing spring 130. When sensor 128' senses the pressure below the threshold, it provides a force less than that of spring 130, allowing spring 130 to extend and actuate first shuttle valve 60' into the second position.

Pressure sensed by sensor 128' can be one of a variety of pressures related to gas turbine engine 10. In one embodiment, the pressure is air pressure downstream of high pressure compressor 22. In another embodiment, the pressure is fuel pressure downstream of fuel pump 29. In yet another embodiment, the pressure is lubricating liquid pressure downstream of auxiliary pump 44. In each of these embodiments, pressure is measurably higher when high pressure spool 20 is rotating at operating speed than when high pressure spool 20 is rotating below operating speed. In still other embodiments, the pressure sensed by sensor 128' can be virtually any pressure that is measurably higher when high pressure spool 20 is rotating at operating speed than when high pressure spool 20 is rotating below operating speed.

Rotational speed of high pressure spool 20 is important because main pump 66 is driven by high pressure spool 20. If high pressure spool 20 rotates slower than operating speed or even stops, then main pump 66 will pump a reduced amount of liquid. In some situations, fan 32 can continue rotating at relatively high speeds when high pressure spool 20 rotates slowly or even stops. This can occur when gas turbine engine 10 is shut down but air still flows across fan 32, such as during an in-flight engine shut-down or when gas turbine engine 10 is on the ground and fan 32 is "windmilling". Speed of high pressure spool 20 is also an indicator of whether gas turbine engine 10 is operating, overall.

Using first shuttle valve 60' in combination with second shuttle valve 62 can also provide substantially continuous liquid to bearings 54. As described above with respect to FIGS. 3A and 3B, second shuttle valve 62 directs fluid from auxiliary pump 44 to bearings 54 when main pump 66 does not supply adequate liquid. If main pump 66 is not supplying adequate liquid due to slow rotation of high pressure spool 20, then sensor 128' can sense pressure below a threshold and first shuttle valve 60' can direct fluid from sump 48 to bearings 54. This allows liquid to be supplied to bearings 54 for an extended period of time of windmilling. If, however, high pressure spool 20 is not rotating slowly, then sensor 128' can sense pressure above the threshold and first shuttle valve 60' can direct fluid from auxiliary pump 68 to bearings 54. This allows liquid to be supplied to bearings 54 for a brief period of zero or negative gravity conditions. This can be beneficial because an interruption in supply from main pump 66 when high pressure spool 20 is rotating at operating speed is most likely due to zero or negative gravity conditions.

Thus, pump system 50, including the valve system combining either first shuttle valve 60 or first shuttle valve 60' with second shuttle valve 62, can provide substantially continuous liquid to bearing 54 under a variety of engine operating conditions. This is done by selecting an appropriate source of liquid depending on the conditions.

It will be recognized that the present invention provides numerous benefits and advantages. For example, pump system 50 can supply a relatively continuous supply of lubricating liquid to components that benefit from substantially continuous lubrication, such as journal bearings, whenever fan shaft 34 is rotating. Additionally, pump system 50 can be a relatively simple, low maintenance system since it uses only one auxiliary pump, as opposed to using separate pumps for windmilling and for zero and negative gravity conditions. Having fewer pumps can also reduce unnecessary piping, thus reducing overall weight of gas turbine engine 10.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, second shuttle valve 62 can be located inside or outside of bearing compartment 52. Additionally, pump system 50 need not be specifically limited to a valve system including a combination of first shuttle valve 60 or first shuttle valve 60' with second shuttle valve 62. Rather, pump system 50 can be used with virtually any valve system so long as the valve system is suitable for selecting an appropriate source of lubricating liquid based upon engine operating conditions.

The invention claimed is:

1. A pump system for lubricating a bearing in a gear system of a gas turbine engine, the pump system comprising:
   a main pump fluidically connected to the bearing through a main supply passage;
   an auxiliary pump fluidically connected to the bearing through an auxiliary supply passage;
   an auxiliary reservoir;
   a sump; and
   a valve system that transfers lubricating liquid from the main pump to the bearing under a first set of engine operating conditions, transfers lubricating liquid from the auxiliary reservoir to the sump and then from the sump through the auxiliary pump to the bearing under a second set of engine operating conditions, and transfers lubricating liquid from the auxiliary reservoir through the auxiliary pump, bypassing the sump, to the bearing under a third set of engine operating conditions.

2. The pump system of claim 1, and further comprising:
   a sensor for sensing pressure in the main supply passage, wherein the first set of engine operating conditions comprises pressure in the main supply passage exceeding a threshold, and wherein the valve system is actuated when the pressure in the main supply passage sensed by the sensor exceeds the threshold.

3. The pump system of claim 1, and further comprising:
   a first sensor for sensing pressure in the main supply passage, wherein the second set of engine operating conditions comprises pressure in the main supply passage being below a threshold; and
a second sensor for sensing another condition selected from the group consisting of:
air pressure downstream of a high pressure compressor being below a threshold;
fuel pressure downstream of a fuel pump being below a threshold;
lubricating liquid pressure downstream of the auxiliary pump being below a threshold; and
gravitational forces acting on the pump system being above a threshold,
wherein the valve system is actuated when the pressure in the main supply passage sensed by the first sensor and the another condition sensed by the second sensor are past their respective thresholds.

4. The pump system of claim 1, and further comprising:
a first sensor for sensing pressure in the main supply passage, wherein the third set of engine operating conditions comprises pressure in the main supply passage being below a threshold; and
a second sensor for sensing another condition selected from the group consisting of:
air pressure downstream of a high pressure compressor being above a threshold;
fuel pressure downstream of a fuel pump being above a threshold;
lubricating liquid pressure downstream of the auxiliary pump being above a threshold; and
gravitational forces acting on the pump system being below a threshold,
wherein the valve system is actuated when the pressure in the main supply passage sensed by the first sensor and the another condition sensed by the second sensor are past their respective thresholds.

5. The pump system of claim 1, wherein the auxiliary pump is driven by the gear system and wherein the gear system comprises a fan drive gear system connecting a fan shaft to a low pressure spool.

6. The pump system of claim 1, wherein the main supply passage does not pass from the main pump through the auxiliary reservoir to the bearing, allowing fluid from the main supply passage to intermingle with fluid in the auxiliary reservoir.

7. A lubrication system for lubricating a bearing in a fan drive gear system for a gas turbine engine, the system comprising:
a main pump;
an auxiliary pump;
an auxiliary reservoir;
a sump;
a first shuttle valve switchable between a first position fluidically connecting the auxiliary reservoir to an inlet of the auxiliary pump and a second position fluidically connecting the sump to the inlet of the auxiliary pump;
a first sensor for sensing an engine operating condition, wherein the first sensor is connected to the first shuttle valve, and wherein the first shuttle valve is actuated between the first and second positions based upon the sensed engine operating condition;
a second shuttle valve switchable between a first position fluidically connecting an outlet of the main pump to a bearing and a second position fluidically connecting an outlet of the auxiliary pump to the bearing; and
a second sensor for sensing fluid pressure between the main pump and the second shuttle valve, wherein the second sensor is connected to the second shuttle valve, and wherein the second shuttle valve is actuated between the first and second positions based upon the sensed fluid pressure.

8. The lubrication system of claim 7, wherein the second shuttle valve fluidically connects an outlet of the auxiliary pump to a main reservoir in the first position and fluidically connects an outlet of the main pump to the main reservoir in the second position.

9. The lubrication system of claim 7, wherein the first sensor comprises a buffer pressure reference sensor having a sensor connected to a component of the gas turbine engine via a sensor passage for sensing the engine operating condition, and wherein the engine operating condition comprises a pressure selected from the group consisting of air pressure downstream of a high pressure compressor, fuel pressure downstream of a fuel pump, and lubricating liquid pressure downstream of the auxiliary pump.

10. The lubrication system of claim 9, wherein the first sensor actuates the first shuttle valve to the first position when the pressure is above a threshold and actuates the first shuttle valve to the second position when the pressure is below the threshold.

11. The lubrication system of claim 7, and further comprising:
a bearing compartment defining a bearing compartment cavity, wherein the sump is positioned at a bottom of the bearing compartment and wherein the bearing compartment cavity contains the auxiliary pump, the auxiliary reservoir, the first shuttle valve, and the fan drive gear system.

12. A method of pumping lubricating liquid in a gas turbine engine, the method comprising:
sensing an engine operating condition;
supplying lubricating liquid from an auxiliary reservoir to a sump and then from the sump to an auxiliary pump when the sensed engine operating condition has a first value in a first range; and
supplying lubricating liquid from the auxiliary reservoir to the auxiliary pump, bypassing the sump, when the sensed engine operating condition has a second value in a second range.

13. The method of claim 12, and further comprising:
pumping lubricating liquid from the auxiliary pump to a bearing of a fan drive gear system.

14. The method of claim 13, and further comprising:
driving the auxiliary pump via the fan drive gear system.

15. The method of claim 12, and further comprising:
sensing pressure in a main supply passage;
pumping lubricating liquid from the auxiliary pump to a bearing when pressure in the main supply passage is below a threshold; and
pumping lubricating liquid from a main pump to the bearing through the main supply passage when pressure in the main supply passage is above the threshold.

16. The method of claim 15, and further comprising:
pumping lubricating liquid from the auxiliary pump to a main reservoir, bypassing the auxiliary reservoir, and then from the main reservoir to the main pump when pressure in the main supply passage is above a threshold.

17. The method of claim 15, and further comprising:
collecting a portion of the lubricating liquid from the bearing in the auxiliary reservoir, wherein that portion of lubricating liquid does not first pass to the sump; and
collecting a portion of the lubricating liquid from the bearing in the sump.

18. The method of claim 12, wherein the engine operating condition comprises gravity.

19. The method of claim 12, wherein the engine operating condition comprises fluid pressure, wherein the first range includes pressure below a threshold, and wherein the second range includes pressure above the threshold.

20. The method of claim 19, wherein the fluid pressure comprises a pressure selected from the group consisting of air pressure downstream of a high pressure compressor, fuel pressure downstream of a fuel pump, and lubricating liquid pressure downstream of the auxiliary pump.

* * * * *